Jan. 5, 1932.  P. E. CHAPMAN  1,839,865
LIQUID LEVEL REGULATOR
Filed April 14, 1924
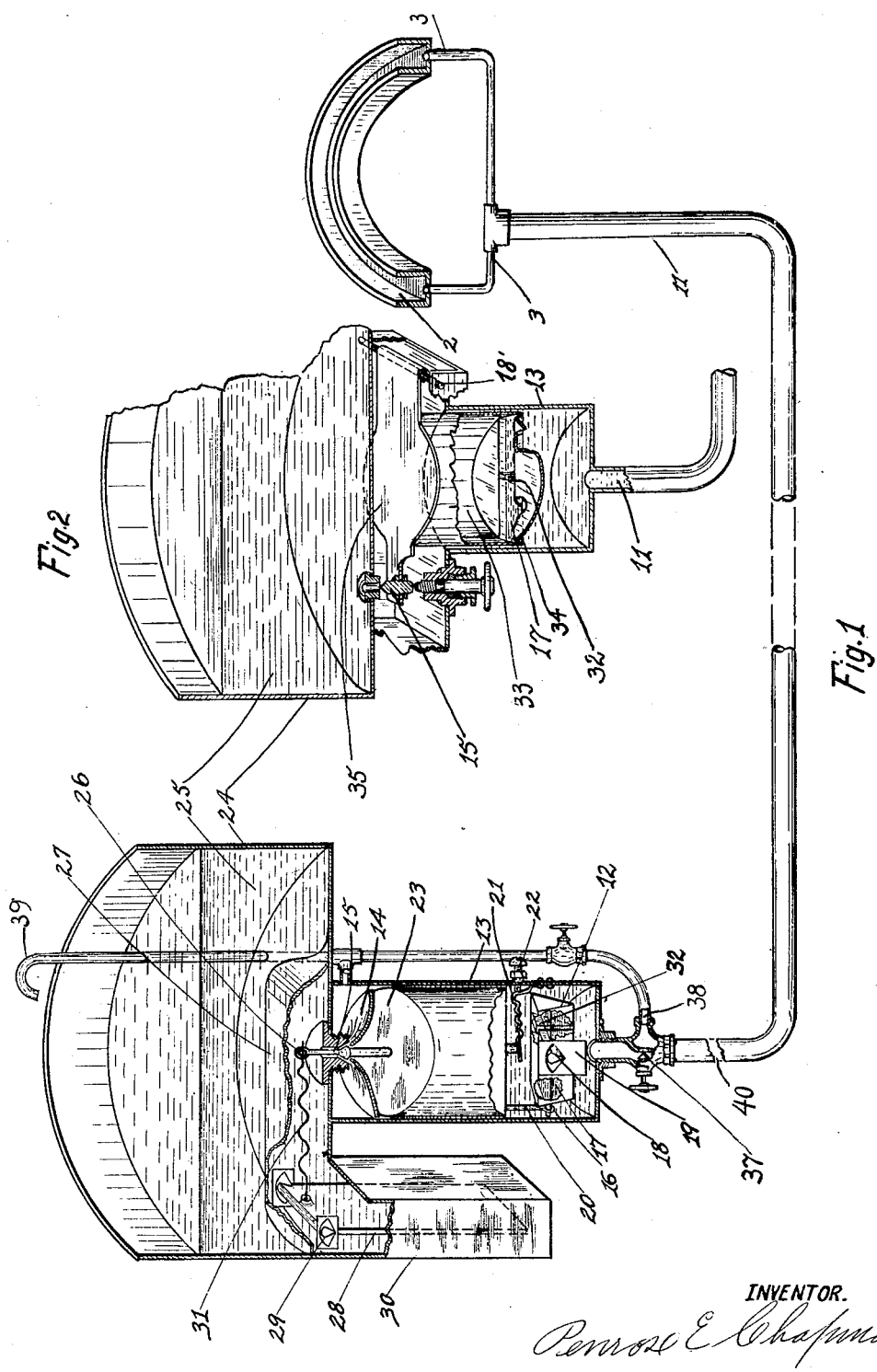
INVENTOR.
Penrose E Chapman Patented Jan. 5, 1932

1,839,865

UNITED STATES PATENT OFFICE

PENROSE E. CHAPMAN, OF ST. LOUIS, MISSOURI

LIQUID-LEVEL REGULATOR

Application filed April 14, 1924. Serial No. 706,364.

The object of my invention is the production of means whereby a liquid, as oil, may be maintained at an accurate or desired level at a point a distance from the source of supply irrespective of the device and its appurtenances being placed on an inclined surface.

It has great usefulness in connection with wickless burners which require accurate levels.

In the drawings Figure 1 shows a diagrammatic section of a burner of the type described, coupled to a source of oil supply and one form of my liquid level control device.

Figure 2 is a variation of the liquid level control device.

There are of course many uses for this device, I have however, shown it in connection with a wickless oil burner 2 which is now a commercial article such as is frequently used for brooders, or hovers as they are sometimes called, incubators and the like. All appurtenances of the burner 2 are omitted, except the pipes 3 and 11 which connect it to a fuel supply.

The difficulty which my improvement is to overcome is that if the burner and reservoir are not placed level, there is either an inadequate supply of oil to the burner owing to the source of supply being lower than the delivery, or what is much worse when the reservoir is raised, the burner is flooded, overflows and sets fire to the building in which it happens to be placed.

The several forms of my device shown in the drawings may be used together or singly, to fit each particular need, as each has a particular usefulness and the combinations thereof have still further fields of usefulness.

It is customary to associate a float liquid level control with the tank 24; such as float 23, which, operating in chamber 13 actuates the valve 15 for admitting oil 25 from the reservoir 24, and maintains the oil level constant in the float chamber, but not in the burner. The part 14 prevents liquid 25 issuing from valve 15 hitting float 23 and disturbing its action.

In order to maintain the oil level constant or as desired at the burner irrespective of the height of the supply tank it is necessary to alter the displacing weight or the buoyancy of the float 23 which controls the level of the oil in the float chamber 13.

To do this automatically it is necessary to use some device responsive to the action of gravity, as a pendulum, or a liquid in a partly filled container that can flow from end to end thereof altering the weight at the said ends. The level vial is possibly the most familiar example of the latter for as the bubble moves it necessarily alters the weight of the ends thereof.

I am going to use the term "level vial" herein to include any liquid container partly filled with liquid that may respond to changes in position of the said container.

If such a vial 17 were suspended on a fulcrum as in Figure 1 at 18 and 19 and connected to the float 23 by any suitable means as pin and link 16 and 20; or combined with the float in any other suitable manner and especially if we use a heavy liquid such as mercury we can automatically alter the displacing weight of the float as desired even to actually reversing the oil level at the burner, that is, cause the oil level at the burner to go down where it would normally rise or vice versa.

The action is, as the device is tipped one way or the other the mercury runs to the low end of the level vial or container changing the amount of or the direction of the action of the weight differential on the float with the resultant change in the liquid level.

In order to avoid waves in the mercury and render the service dead beat when the device is agitated I may provide a restricted passage between the ends of the mercury container as the baffles 32.

The term "dead beat" indicates that the movement of an element from one point or condition to another, occurs without accompanying oscillation, such as the wave motion that follows the disturbance of a liquid; the swinging of a pendulum or an instrument needle after its equilibrium has been disturbed. In other words the element moves to the second position and stays there.

Adjustment of the oil level may be had by any suitable means as the spring and screw 21 and 22, Figure 1.

In order to magnify the weight differential of the ends of the mercury level vial I prefer to make the section thereof such that as the mercury goes down in one end and rises in the other it respectively decreases in area at one end and increases in area at the other end. Such a construction is shown, for the vial 12 (Figure 1) and mercury trough in the floor of the float 33 (Figure 2) are of a triangular section.

By varying the shape of these vial walls liquid level controls other than those having straight line characteristics may be obtained.

Figure 2 is a modification in which the pivot 18, Figure 1, suspending the level vial, 17, has been moved to the point 18′, which with the aid of part 35 suspends both float 33, level vial 17, and the valve, 15. Parts of Figure 2, numbered the same as those in Figure 1, are similar and have duplicate functions.

The level vial methods above are capable of very accurate work and are quite plastic in the hands of the designer.

In an apparatus where the level requirements are not so fine, or where costs are more of a consideration or as a double control (one to act in case the other fails) I may use a pendulum 28 for controlling the displacing weight of the float. This pendulum may be suspended by any suitable means as fulcrum 29 and connected to the float by any suitable means as by spring 31 in eye 26 which may be protected by the cover 27.

As the device is tipped the pendulum will swing one way or the other changing its action on the float and thereby changing the oil level in the float chamber an amount to compensate for the difference in the level of the burner and the supply.

To render the device dead beat I prefer to swing the pendulum 28, in the liquid filled chamber 30 which will act as a dash pot, and because said pendulum is well below the surface of the liquid in said chamber it will not be subject to wave action when the device is disturbed. Also because the chamber 30 is open only at its top it cannot become empty when the reservoir 24 is drained by use.

In the arrangement shown owing to the slight motion of the pendulum in response to slight variations in level of the apparatus it is quite desirable to connect it to the float with considerable leverage.

I may also combine with the above or separately as the requirements of such a piece of apparatus may dictate a feed valve 37.

The term "float" is used herein to include any and all variations of such valve controlling members, and as there are many variations of my device all coming within the scope of this invention, I do not limit myself to the specific forms shown.

Having described my invention, I wish to claim:

1. In a liquid level regulator, the combination of means for regulating the level of a liquid in a container with gravity actuated means for altering the level maintained by said first means in response to tilting of the apparatus.

2. In a device of the class described, the combination of means for regulating the level of the liquid in a container, having gravity controlled means for altering the level maintained by said first means in response to tilting of the said device and a liquid using device connected to the said container.

3. In a device of the class described, the combination of means for regulating the level of the liquid in a container, having gravity controlled means for altering the level maintained by said first means in response to tilting of the said device, and a liquid using device connected to the source of fuel supply through said regulating means.

4. In a device of the class described, the combination of float actuated means for regulating the level of a liquid in a container, with gravity actuated means for altering the level maintained by said float actuated means, in response to tilting of the apparatus.

5. In a device of the class described, the combination of float actuated means for regulating the level of a liquid in a container, gravity control means for altering the level maintained by said float actuated means in response to tilting of said device and a liquid using device associated therewith.

6. In a device of the class described, the combination of a liquid chamber, a float actuated means for regulating the level of said liquid, gravity controlled means for altering the level maintained by said float actuated means in response to tilting of the device, and a liquid using device connected to said chamber.

7. In a liquid level regulator, the combination of means for maintaining a desired level of liquid at a distance from said regulator consisting of means for regulating the level of the liquid and gravity actuated means for altering the level maintained by said first means in response to tilting of the apparatus.

8. In a liquid level regulator, the combination of a float operated regulating valve with a "level vial" associated therewith in a manner to alter the displacement of said float when the apparatus is tilted.

9. In a liquid level regulator, means for maintaining a desired level of liquid at a distance from the regulator, comprising a regulating float, a "level vial" pivotally mounted and connected to the said float in a manner to alter its buoyancy when the apparatus is tilted.

10. In a liquid level regulator, means for maintaining a desired level of liquid at a distance from the regulator, comprising a regulating float, a "level vial" attached thereto and pivotal mountings for said vial.

11. In a liquid level regulator, means for maintaining a desired level of liquid at a distance from the regulator, comprising a regulating float, and a "level vial" attached to the float and having walls placed at desired distances from each other to permit of automatically controlling the action of said vial at different angular positions.

12. In a liquid level regulating device the combination of means for regulating the level of a liquid in a container with means for altering the level maintained by said means in response to tilting of the device consisting of a "level vial" connected to said means having its sides placed in a manner to attain a desired reaction therefrom when at different angular positions.

13. In a liquid level regulator means for altering the level of liquid maintained in a container in response to changes in level of the apparatus comprising a "level vial" connected to said means which has side walls placed at an angle to each other.

14. In a liquid level regulator, means for maintaining a desired level of liquid at a distance from the regulator, comprising a regulating float, a "level vial" attached thereto and pivotal mountings for said vial, and a regulating valve actuated by the said float.

15. In a liquid level regulator, the combination of means for regulating the level of a liquid in a container with a level vial associated therewith, for the purpose of altering the level maintained by the said means when the level of the apparatus is changed, said vial having a restricted passage between its ends for the purpose of rendering it dead beat.

16. In a liquid level regulator, the combination of a regulating float with a pendulum acting thereon for altering the level maintained in the float chamber by said float in response to tilting of the apparatus.

17. In a liquid level regulator, the combination of a regulating float with a pendulum flexibly connected thereto for altering the level maintained in the float chamber by said float in response to tilting of the apparatus.

18. In a liquid level regulator, the combination of a level regulating float in a chamber, a pendulum immersed in a liquid and connected to said float for altering the level maintained in said chamber by said float in response to tilting of the said apparatus.

19. In a liquid level regulator, the combination of a level regulating float in a chamber, a pendulum connected to said float for altering the level maintained by said float in said chamber in response to the tilting of the apparatus and a dash pot for rendering the motion of said pendulum dead beat.

20. In a device of the class described, the combination of a liquid level regulating float in a container, a pendulum connected to the float for altering the level regulated by said float in response to tilting of the apparatus and a liquid using device connected to said container at which the said device maintains the liquid fuel supply level as desired.

In testimony whereof I have hereunto affixed my signature this 11th day of April, 1924.

PENROSE E. CHAPMAN.